United States Patent
Min

(10) Patent No.: US 12,351,122 B2
(45) Date of Patent: Jul. 8, 2025

(54) ROOF-MOUNTED AIR BAG

(71) Applicant: HYUNDAI MOBIS CO., LTD., Seoul (KR)

(72) Inventor: Byung Ho Min, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 625 days.

(21) Appl. No.: 17/741,535

(22) Filed: May 11, 2022

(65) Prior Publication Data

US 2022/0371540 A1     Nov. 24, 2022

(30) Foreign Application Priority Data

May 24, 2021    (KR) ........................ 10-2021-0066247

(51) Int. Cl.
    *B60R 21/214*     (2011.01)
    *B60R 21/231*     (2011.01)
    *B60R 21/233*     (2006.01)
    *B60R 21/2338*     (2011.01)

(52) U.S. Cl.
    CPC .......... *B60R 21/214* (2013.01); *B60R 21/233* (2013.01); *B60R 21/2338* (2013.01); *B60R 2021/23107* (2013.01); *B60R 2021/23153* (2013.01); *B60R 2021/23161* (2013.01); *B60R 2021/23192* (2013.01); *B60R 2021/23386* (2013.01)

(58) Field of Classification Search
    CPC . B60R 21/214; B60R 21/233; B60R 21/2338; B60R 2021/23107; B60R 2021/23153; B60R 2021/23161; B60R 2021/23192; B60R 2021/23308; B60R 2021/23386
    See application file for complete search history.

(56) References Cited

U.S. PATENT DOCUMENTS

| | | | |
|---|---|---|---|
| 9,725,064 B1* | 8/2017 | Faruque | B60N 2/143 |
| 10,065,592 B2* | 9/2018 | Jaradi | B60R 21/214 |
| 10,343,642 B2* | 7/2019 | Faruque | B60R 21/214 |
| 10,407,018 B2 | 9/2019 | Sundararajan et al. | |
| 10,589,708 B2* | 3/2020 | Cho | B60R 21/0136 |
| 10,625,701 B2* | 4/2020 | Cho | B60R 21/214 |
| 10,682,974 B2* | 6/2020 | Thomas | B60R 21/232 |
| 10,688,955 B2* | 6/2020 | Shin | B60R 21/214 |
| 10,703,320 B2* | 7/2020 | Farooq | B60R 21/231 |
| 10,981,531 B2* | 4/2021 | Jaradi | B60N 2/143 |
| 11,117,540 B2* | 9/2021 | Hwangbo | B60R 21/214 |
| 11,267,431 B2* | 3/2022 | Sekizuka | B60R 21/26 |
| 11,273,786 B2* | 3/2022 | Ostling | B60R 21/231 |
| 11,345,299 B2* | 5/2022 | Jeong | B60R 21/261 |
| 11,351,949 B2* | 6/2022 | Fischer | B60R 21/216 |

(Continued)

FOREIGN PATENT DOCUMENTS

CN       111469796 A      7/2020

*Primary Examiner* — Laura Freedman
(74) *Attorney, Agent, or Firm* — Novo TechIP International PLLC

(57) ABSTRACT

A roof-mounted airbag includes a cushion having a first chamber and a second chamber deployed downward from a vehicle roof while being inflated toward passengers facing each other, and a support chamber deployed between the first chamber and the second chamber and configured to push intermediate portions of the first and second chambers toward the passengers facing each other.

15 Claims, 3 Drawing Sheets

(56) References Cited

U.S. PATENT DOCUMENTS

| | | | |
|---|---|---|---|
| 11,608,022 B2* | 3/2023 | Min | B60R 21/2338 |
| 11,639,148 B2* | 5/2023 | Jeong | B60R 21/214 |
| | | | 280/730.1 |
| 11,648,908 B2* | 5/2023 | Sung | B60R 21/231 |
| | | | 280/730.1 |
| 11,648,910 B2* | 5/2023 | Lee | B60R 21/231 |
| | | | 280/730.2 |
| 11,697,388 B2* | 7/2023 | Min | B60R 21/214 |
| | | | 280/730.2 |
| 11,702,026 B2* | 7/2023 | Jaradi | B60R 21/231 |
| | | | 280/753 |
| 11,745,688 B2* | 9/2023 | Min | B60R 21/231 |
| | | | 280/730.1 |
| 11,926,279 B2* | 3/2024 | Min | B60R 21/233 |
| 12,128,848 B2* | 10/2024 | Min | B60R 21/231 |
| 2020/0384940 A1* | 12/2020 | Sekizuka | B60R 21/0132 |
| 2020/0406852 A1* | 12/2020 | Fischer | B60R 21/26 |
| 2023/0294630 A1* | 9/2023 | Sung | B60R 21/232 |
| | | | 280/728.2 |

* cited by examiner

ROOF-MOUNTED AIR BAG

CROSS-REFERENCE TO RELATED APPLICATIONS

The present application claims priority to Korean Patent Application No. 10-2021-0066247, filed May 24, 2021, the entire contents of which is incorporated herein for all purposes by this reference.

BACKGROUND

1. Technical Field

The present disclosure relates to a roof-mounted airbag which safely protects passengers seated on opposite seats in a face-to-face state by stably deploying a cushion having a shell shape toward the passengers.

2. Discussion of Related Art

Autonomous vehicles have various seat arrangements such as long travel, swivel, and relaxation modes.

Accordingly, restraint devices such as airbags are mounted in various forms not only on seats, but also on an interior of a vehicle cabin to safely protect passengers seated on seats.

On the other hand, in the case of a vehicle in which front and rear seats are mounted facing each other in an interior of a vehicle cabin, an airbag is mounted on a roof positioned between the front and rear seats.

Such an airbag is operated such that upon a vehicle collision accident, a cushion mounted on a roof panel is inflated in a shell shape toward passengers seated in the front and rear seats while being deployed downward from the roof panel, so that the passengers seated on the front and rear seats are loaded on front and rear surfaces of the cushion, thereby protecting the passengers.

However, in the process of the cushion deployment, there is a problem in that the cushion cannot be deployed in a shell shape due to the folded state of the cushion or the interference by trims mounted on a vehicle.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a roof-mounted airbag which safely protects passengers seated on opposite seats in a face-to-face state by stably deploying a cushion having a shell shape toward the passengers.

In order to accomplish the above and other objectives, according to an aspect of the present disclosure, there is provided a roof-mounted airbag including: a cushion having a first chamber and a second chamber deployed downward from a vehicle roof while being inflated toward passengers facing each other; and a support chamber deployed between the first chamber and the second chamber and configured to push intermediate portions of the first and second chambers toward the passengers facing each other.

In an embodiment, both ends of the support chamber may be connected to the intermediate portions of the first and second chambers.

In an embodiment, upper ends of the first and second chambers may be mounted on a roof panel; the first chamber and the second chamber may each be deployed in a ring shape; and lower ends of the first and second chambers may be connected to each other.

In an embodiment, the support chamber may be connected between a ring-shaped inner surface of the first chamber and a ring-shaped inner surface of the second chamber.

In an embodiment, the support chamber may include: a first support part horizontally connected to the ring-shaped inner surface of the first chamber; a second support part horizontally connected to the ring-shaped inner surface of the second chamber; and a connection part connected between the first support part and the second support part.

In an embodiment, the connection part may be provided as at least one connection part connected to a portion of the first support part and the second support part.

In an embodiment, gas inlets may be formed in the first chamber and the second chamber, respectively, to allow gases to be separately injected into the first chamber and the second chamber.

In an embodiment, the gas inlets may be formed at the upper ends of the first and second chambers to allow the first chamber and the second chamber to be deployed from an upper side to a lower side.

In an embodiment, the gas inlets of the first and second chambers may be formed in opposite directions.

In an embodiment, gases supplied into the first chamber and the second chamber may be introduced into the support chamber so that the support chamber is deployed.

In an embodiment, a tether having a shorter length than the first chamber and the second chamber may be connected between an upper end and a lower end of the cushion in a shape of crossing the support chamber.

In an embodiment, an upper end of the tether may be connected to the upper ends of the first chamber and the second chamber; and a lower end of the tether may be connected to lower ends of the first chamber and the second chamber.

According to the above-described configuration of the present disclosure, the first chamber is deployed in a shell shape protruding toward a passenger seated on the front seat and the second chamber is deployed in a shell shape protruding toward a passenger seated on the rear seat by the support chamber deployed between the first chamber and the second chamber. Therefore, the cushion is always stably deployed in a shell shape regardless of the folded state of the cushion or the interference by other trims, thereby having the effect of safely protecting the passengers seated on the front and rear seats facing each other.

BRIEF DESCRIPTION OF THE DRAWINGS

The above and other objectives, features, and advantages of the present disclosure will be more clearly understood from the following detailed description when taken in conjunction with the accompanying drawings, in which.

DETAILED DESCRIPTION

Figure 1:
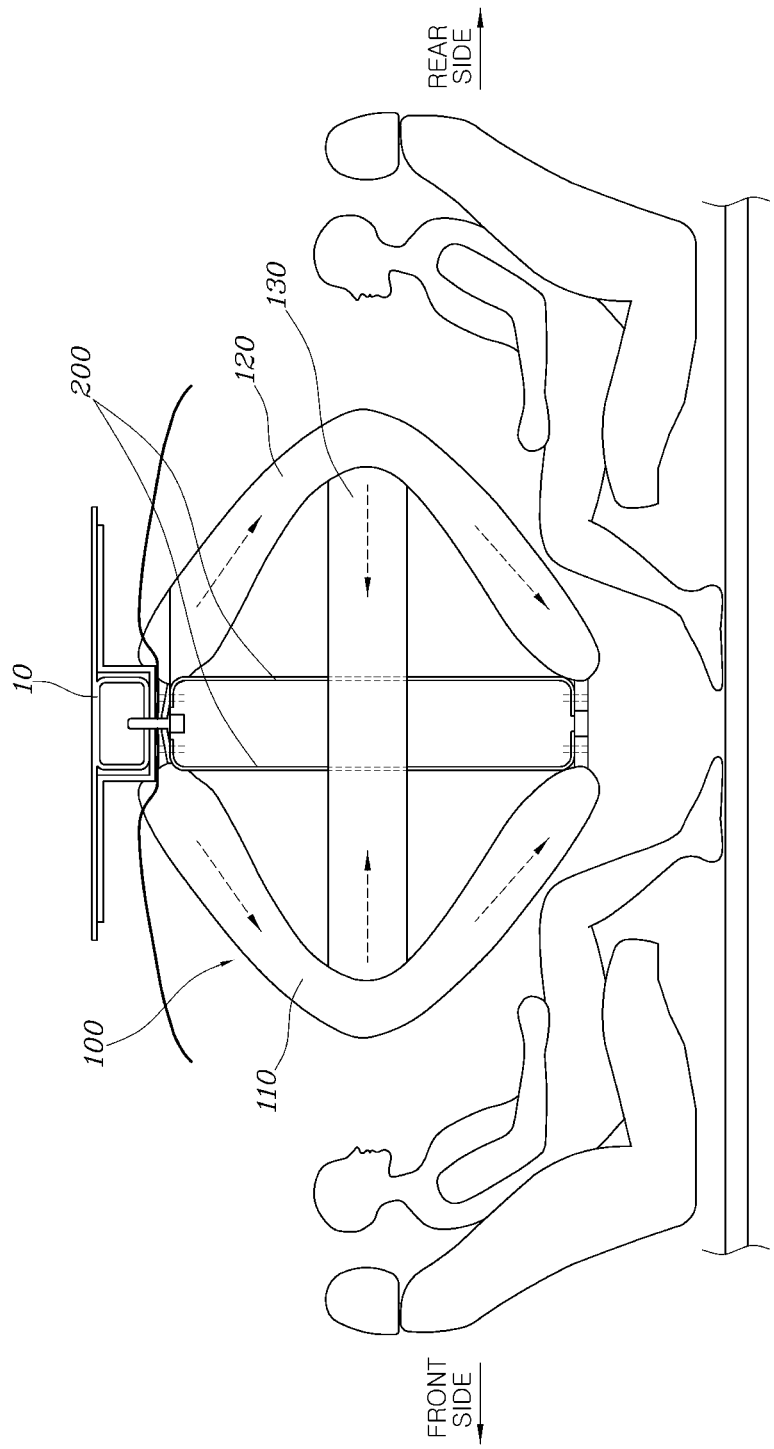
FIG. 1 is a diagram illustrating a shape in which a cushion of an airbag according to the present disclosure is deployed.

Specific structural or functional descriptions of the embodiments of the present disclosure disclosed herein are merely exemplified for the purpose of illustrating the embodiments according to the present disclosure, and the embodiments of the present disclosure are implemented in various forms, and may not be construed as being limited to the embodiments described in this specification or application.

Since the embodiment according to the present disclosure can be diversely modified into various forms, specific embodiments will be illustrated and described in detail in the drawings and the description of the present disclosure. However, this is not intended to limit the embodiments according to the concept of the present disclosure to specific disclosure forms, but should be understood to include all modifications, equivalents, or substitutes included in the spirit and scope of the present disclosure.

It will be understood that although the terms "first," "second," etc. may be used herein to describe various elements, these elements should not be limited by these terms. These terms are only used to distinguish one element from another element. Thus, a first element discussed below could be termed a second element and vice versa without departing from the nature of the present disclosure.

It will be understood that when an element is referred to as being "connected" or "coupled" to another element, it can be directly connected or coupled to the other element or intervening elements may be present therebetween. In contrast, when an element is referred to as being "directly connected" to another element, there are no intervening elements present. Other expressions describing the relationship between the components, such as "between" and "immediately between" or "neighboring" and "directly neighboring" should also be interpreted in the same manner.

The terminology used herein is for the purpose of describing particular embodiments only and is not intended to limit the invention. As used herein, the singular forms "a," "an," and "the" are intended to include the plural forms as well, unless the context clearly indicates otherwise. It will be further understood that the terms "comprises" and/or "comprising," or "includes" and/or "including," when used in this specification, specify the presence of stated features, integers, steps, operations, elements, components or combinations thereof, but do not preclude the presence or addition of one or more other features, integers, steps, operations, elements, components, or combinations thereof.

Unless otherwise defined, the meaning of all terms including technical and scientific terms used herein is the same as that commonly understood by one of ordinary skill in the art to which the present invention belongs. It will be further understood that terms, such as those defined in commonly used dictionaries, should be interpreted as having a meaning which is consistent with their meaning in the context of the relevant art and the present disclosure, and will not be interpreted in an idealized or overly formal sense unless expressly so defined herein.

A preferred embodiment of the present disclosure will now be described in detail with reference to the accompanying drawings.

FIG. 1 is a diagram illustrating a shape in which a cushion 100 of an airbag according to the present disclosure is deployed.

Referring to FIG. 1, a roof-mounted airbag of the present disclosure includes: a cushion 100 having a first chamber 110 and a second chamber 120 are inflated toward passengers facing each other while being deployed downward from a roof of a vehicle; and a support chamber 130 deployed to be positioned between the first chamber 110 and the second chamber 120 and configured to push intermediate portions of the first chamber 110 and the second chamber 120 toward the passengers facing each other.

For example, when a front seat and a rear seat are mounted oppositely inside a vehicle, an airbag module including the cushion 100 is mounted inside of the vehicle roof located between the front seat and the rear seat.

Accordingly, during a vehicle collision, the first chamber 110 is deployed downward toward the front seat, and the second chamber 120 is deployed downward toward the rear seat.

In particular, as the support chamber 130 is deployed between the first chamber 110 and the second chamber 120, the first chamber 110 is deployed in a shell shape that protrudes toward the passenger seated on the front seat, and the second chamber 120 is deployed in a shell shape that protrudes toward the passenger seated on the rear seat.

Accordingly, the cushion 100 is always deployed stably in a shell shape regardless of the folded state of the cushion 100 or interference by other trims, thereby more safely protecting the passengers loaded on the cushion 100.

In addition, in the present disclosure, both ends of the support chamber 130 have a structure connected to intermediate portions of the first chamber 110 and the second chamber 120.

That is, a front end of the support chamber 130 is connected to the intermediate portion of the first chamber 110, and a rear end of the support chamber 130 is connected to the intermediate portion of the second chamber 120, so that during the deployment process, the support chamber 130 pushes the intermediate portions of the first chamber 110 and the second chamber 120 toward the front side and the rear side of a vehicle, respectively, thereby facilitating the first chamber 110 and the second chamber 120 to be reliably deployed in a shell shape.

Figure 2:
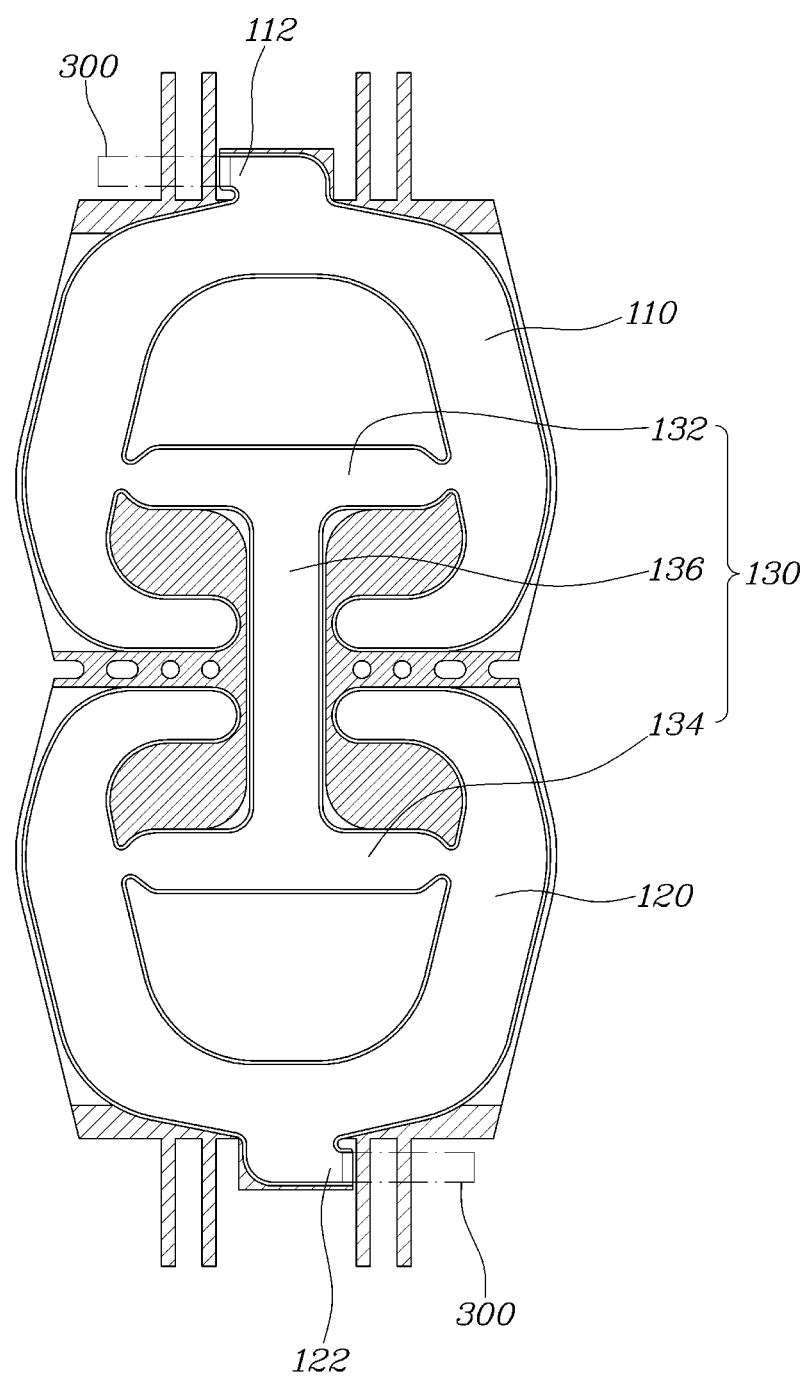
FIG. 2 is a diagram illustrating an unfolded state of a cushion having a first embodiment structure according to the present disclosure.

FIG. 2 is a diagram illustrating an unfolded state of the cushion 100 having a first embodiment structure according to the present disclosure.

Referring to FIGS. 1 and 2, in the present disclosure, upper ends of the first chamber 110 and the second chamber 120 are mounted on a roof panel 10 by bolting, etc., the first chamber 110 and the second chamber 120 are each deployed in a ring shape, and lower ends of the first chamber 110 and the second chamber 120 are connected to each other.

That is, the first chamber 110 and the second chamber 120 are fixed to each other at the upper and lower ends of the cushion 100, and an intermediate portion of the cushion 100 is extended back and forth by the support chamber 130. Accordingly, the shell shape of the first chamber 110 and the second chamber 120 is stably implemented, and the first chamber 110 and the second chamber 120 are deployed in a ring shape so that the passenger protection area is extended to the left and right sides, thereby more safely protecting the passengers seated on the seats.

In addition, the present disclosure has a structure in which the support chamber 130 is connected between a ring-shaped inner surface of the first chamber 110 and a ring-shaped inner surface of the second chamber 120.

Specifically, the support chamber 130 includes: a first support part 132 horizontally connected to the ring-shaped inner surface of the first chamber 110; a second support part 134 horizontally connected to the ring-shaped inner surface of the second chamber 120; and a connection part 136 connected between the first support part 132 and the second support part.

That is, the first support part 132 is connected to left and right sides at the intermediate portion of the first chamber 110 that is deployed in a ring shape, the second support part 134 is connected to left and right sides at the intermediate portion of the second chamber 120 that is deployed in a ring shape, and the connection part 136 is connected to a portion where the first support part 132 and the second support part 134 face each other.

Accordingly, the first support part 132 and the second support part 134 are horizontally supported by the first chamber 110 and the second chamber 120, so that the ring shape of the first chamber 110 and the second chamber 120 is stably maintained not only to improve the deployment performance of the cushion 100, but also to more safely protect passengers supported by the cushion 100.

Furthermore, the connection part 136 may be provided as at least one connection part connected to a portion of the first support part 132 and the second support part 134.

That is, one or more support chambers 130 may be formed depending on the shape of the cushion 100 and the capacity of an inflator 300.

Figure 3:
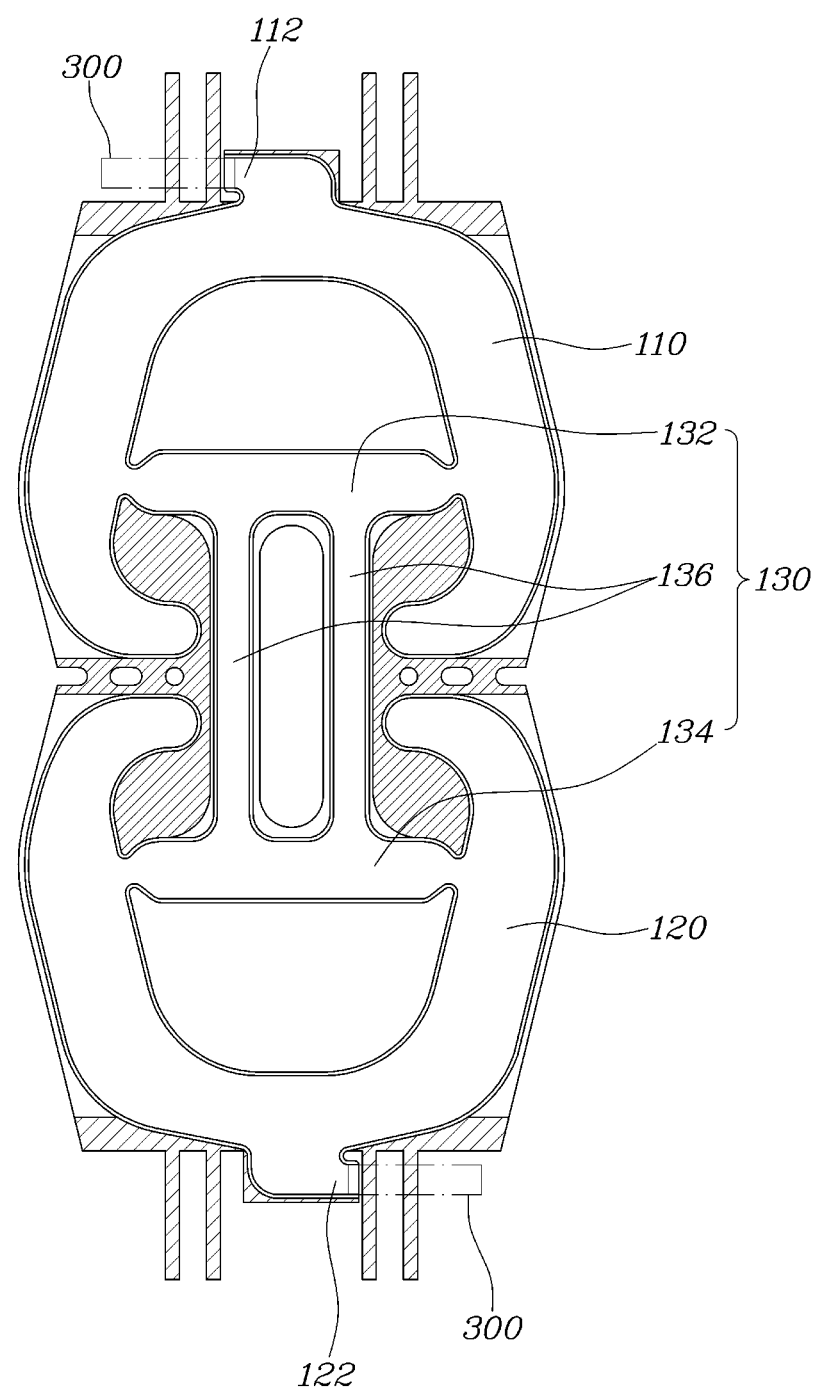
FIG. 3 is a diagram illustrating an unfolded state of a cushion having a second embodiment structure according to the present disclosure.

FIG. 3 is a diagram illustrating an unfolded state of a cushion having a second embodiment structure according to the present disclosure. As illustrated in FIG. 3, when the two support chambers 130 are formed, the two support chambers 130 may be arranged side by side between the first support part 132 and the second support part 134.

Meanwhile, referring to FIG. 2, in the present disclosure, gas inlets 112 and 122 are formed in the first chamber 110 and the second chamber 120, respectively, so that gases may be individually injected into the first chamber 110 and the second chamber 120.

That is, since gases may be individually injected into the first chamber 110 and the second chamber 120, gases may be injected into the first chamber 110 and the second chamber 120 simultaneously or sequentially with a certain time interval depending on vehicle collision situations, which makes it possible to deploy the cushion 100.

To this end, an inflator 300 for injecting gas into the first chamber 110 and an inflator 300 for injecting gas into the second chamber 120 are separately installed, and during a vehicle collision, an operation signal is applied to the inflators 300 to inject gases into the first chamber 110 and the second chamber 120 according to collision conditions.

However, if gases can be individually injected through one inflator, only one inflator may be installed.

In addition, the gas inlets 112 and 122 are formed in the upper ends of the first chamber 110 and the second chamber 120 so that the first chamber 110 and the second chamber 120 can be deployed from the upper part to the lower part.

For example, the inflators 300 are connected to the gas inlets 112 and 122, so that the upper ends of the first chamber 110 and the second chamber 120 are first deployed by the gases provided from the inflators 300, and then the gases flow to the lower side to deploy the cushion 100.

In addition, the gas inlet 112 of the first chamber 110 and the gas inlet 122 of the second chamber 120 may be formed oppositely.

For example, when the gas inlet 112 of the first chamber 110 is provided toward the left side of a vehicle, the gas inlet 122 of the second chamber 120 is provided toward the right side of the vehicle, so that the gas inlets 112 and 122 of the respective chambers are formed in opposite directions.

For this reason, it is possible to prevent the pressure of the gas injected into the cushion 100 from being biased to one side, thereby smoothly injecting the gas into the cushion 100 and also deploying the cushion 100 to a desired deployment position.

In addition, in the present disclosure, the gas supplied into the first chamber 110 and the second chamber 120 is introduced into the support chamber 130 so that the support chamber is deployed.

To this end, both ends of the first support part 132 on the left and right sides of the inner surface of the first chamber 110 communicate with each other, and both ends of the second support part 134 on the left and right sides of the inner surface of the second chamber 120 communicate with each other.

Accordingly, the gas injected into the first chamber 110 and the second chamber 120 is introduced into the support chamber 130 through a portion communicating with the first support part 132 and the second support part 134 so as to deploy the support chamber 130.

Meanwhile, referring to FIG. 1, in the present disclosure, a tether 200 having a shorter length than that of the first chamber 110 and the second chamber 120 may be connected between the upper end and the lower end of the cushion 100 in a shape of crossing the support chamber 130.

For example, the tether 200 is formed from a rectangular cotton material whose vertical length is formed shorter than a length of the first chamber 110 and the second chamber 120 deployed in a vertical direction.

At least one of these tethers 200 is connected and intersects vertically with the support chamber 130 without contacting the support chamber 130, so that the support chamber 130 and the tethers 200 do not interfere with each other.

To this end, the tethers 200 may be vertically connected to both sides of the connection part 136 of the support chamber 130 at a predetermined interval.

That is, the tether 200 is formed shorter than the vertical length of the chambers being deployed so that the tether 200 is connected between the upper end and the lower end of the cushion 100, and the intermediate portions of the first chamber 110 and the second chamber 120 are pushed and deployed toward the front and rear sides through the support chamber 130, thereby allowing the first chamber 110 and the second chamber 120 to be more reliably deployed in a shell shape.

In addition, the upper end of the tether 200 is connected to the upper ends of the first chamber 110 and the second chamber 120, respectively, and the lower end of the tether 200 is connected to the lower ends of the first chamber 110 and the second chamber 120.

For reference, the first chamber 110 and the second chamber 120 constituting the cushion 100 may be provided separately or may be formed as a single cushion 100.

Accordingly, when the first chamber 110 and the second chamber 120 are separately provided, the lower end of the tether 200 may be connected to the lower end of the first chamber 110 and the lower end of the second chamber 120, respectively, and when the first chamber 110 and the second chamber 120 are integrally formed, the lower end of the tether 200 may be connected to a portion where the lower end of the first chamber 110 and the lower end of the second chamber are connected.

As described above, according to the present disclosure, as the support chamber 130 is deployed to be positioned between the first chamber 110 and the second chamber 120, the first chamber 110 is deployed in a shell shape protruding toward the passenger seated on the front seat, and the second chamber 120 is deployed in a shell shape protruding toward the passenger seated on the rear seat.

Therefore, the cushion 100 is always stably deployed in a shell shape regardless of the folded state of the cushion 100 or the interference by other trims, thereby safely protecting the passengers loaded on the cushion 100.

Although the present disclosure has been described and illustrated with respect to the specific embodiments, those skilled in the art will appreciate that various improvements and modifications are possible, without departing from the scope and spirit of the present invention as disclosed in the accompanying claims.

What is claimed is:

1. A roof-mounted airbag comprising:
   a cushion having first and second chambers configured, when inflated, to deploy downwardly from a roof of a vehicle toward passengers facing each other in the vehicle, each of the first and second chambers having an intermediate portion;
   a support chamber configured, when inflated, to be positioned between the first and second chambers and push the intermediate portions of the first and second chambers toward the passengers; and
   a tether shorter than each of the first and second chambers, wherein the tether is coupled between an upper end and a lower end of the cushion and vertically extends across the support chamber.

2. The roof-mounted airbag according to claim 1, wherein the support chamber has a first end connected to the intermediate portion of the first chamber and a second end connected to the intermediate portion of second chamber.

3. The roof-mounted airbag according to claim 1, wherein:
   each of the first and second chambers has upper and lower ends,
   the upper ends of the first and second chambers are connected to a roof panel of the vehicle,
   the first and second chambers are configured to deploy in a ring shape, and
   the lower ends of the first and second chambers are connected to each other.

4. The roof-mounted airbag according to claim 3, wherein:
   each of the first and second chambers has an inner surface having a ring shape, and
   the support chamber extends between the inner surfaces of the first and second chambers.

5. The roof-mounted airbag according to claim 4, wherein the support chamber includes:
   a first support part extending horizontally and connected to the inner surface of the first chamber;
   a second support part extending horizontally and connected to the inner surface of the second chamber; and
   a connection part extending between the first and second support parts.

6. The roof-mounted airbag according to claim 5, wherein the connection part comprises a plurality of connection parts.

7. The roof-mounted airbag according to claim 1, wherein the first and second chambers respectively include first and second gas inlets, the first and second gas inlets respectively configured to inject a gas into the first and second chambers.

8. The roof-mounted airbag according to claim 7, wherein:
   the first gas inlet is positioned at an upper end portion of the first chamber, and
   the second gas inlet is positioned at an upper end portion of the second chamber.

9. The roof-mounted airbag according to claim 7, wherein the first gas inlet faces in a first direction, and the second gas inlet faces in a second direction opposite to the first direction.

10. The roof-mounted airbag according to claim 1, wherein a gas is injected into the support chamber via the first and second chambers.

11. The roof-mounted airbag according to claim 1, wherein the tether includes an upper end connected to upper ends of the first and second chambers and a lower end connected to lower ends of the first and second chambers.

12. A roof-mounted airbag comprising:
    a cushion having first and second chambers configured, when inflated, to deploy downwardly from a roof of a vehicle toward passengers facing each other in the vehicle, each of the first and second chambers having an intermediate portion; and
    a support chamber configured, when inflated, to be positioned between the first and second chambers and push the intermediate portions of the first and second chambers toward the passengers,
    wherein upper ends of the first and second chambers are connected to a roof panel of the vehicle, and lower ends of the first and second chambers are connected to each other, and
    wherein, when pushed by the support chamber, the intermediate portions of the first and second chambers protrude away from each other such that a horizontal gap between the first and second chambers is greatest between the intermediate portions of the first and second chambers.

13. The roof-mounted airbag of claim 12, wherein:
    the first and second chambers are configured to deploy in a first ring shape,
    each of the first and second chambers has an inner surface having a second ring shape, and
    the support chamber has a portion extending between the inner surfaces of the first and second chambers.

14. The roof-mounted airbag of claim 13, wherein the support chamber includes:
    a first support part extending horizontally and connected to the inner surface of the first chamber;
    a second support part extending horizontally and connected to the inner surface of the second chamber; and
    a connection part extending between the first and second support parts.

15. The roof-mounted airbag of claim 14, wherein the connection part comprises a plurality of connection parts.

* * * * *